United States Patent
Kernan

(10) Patent No.: US 10,123,163 B2
(45) Date of Patent: Nov. 6, 2018

(54) MANAGING A USER'S GEOLOCATION HOME RANGE

(71) Applicant: Microsoft Technology Licensing, LLC, Redmond, WA (US)

(72) Inventor: Brian Kernan, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/294,717

(22) Filed: Oct. 15, 2016

(65) Prior Publication Data
US 2018/0109914 A1    Apr. 19, 2018

(51) Int. Cl.
*H04W 4/021* (2018.01)
*H04W 4/029* (2018.01)

(52) U.S. Cl.
CPC .......... *H04W 4/021* (2013.01); *H04W 4/029* (2018.02)

(58) Field of Classification Search
CPC .............................. H04W 4/021; H04W 4/028
See application file for complete search history.

(56) References Cited

U.S. PATENT DOCUMENTS

| | | | |
|---|---|---|---|
| 7,493,211 B2 | 2/2009 | Breen | |
| 7,750,840 B2* | 7/2010 | Wood | G01S 13/726 342/189 |
| 8,471,701 B2 | 6/2013 | Yariv et al. | |
| 8,971,930 B2 | 3/2015 | Li et al. | |
| 9,215,560 B1 | 12/2015 | Jernigan | |
| 9,338,759 B2 | 5/2016 | Chowdhury et al. | |
| 9,408,031 B1* | 8/2016 | Steger | H04W 4/021 |
| 9,473,890 B1* | 10/2016 | Liu | G01S 5/0284 |
| 9,749,794 B2* | 8/2017 | Saha | H04W 4/021 |
| 2009/0009398 A1* | 1/2009 | Taylor | G01S 5/0072 342/451 |
| 2013/0097246 A1* | 4/2013 | Zifroni | G06Q 50/01 709/204 |
| 2013/0225196 A1* | 8/2013 | James | H04W 4/029 455/456.1 |
| 2015/0081212 A1 | 3/2015 | Mitchell et al. | |

(Continued)

FOREIGN PATENT DOCUMENTS

WO    WO2014085657 A1    6/2014

OTHER PUBLICATIONS

Anderson, "Augmented reality, custom geofencing, smart "rewind" and more in new 3DR Solo software", Apr. 18, 2016, pp. 5, Chris Anderson, retrieved at <<http://diydrones.com/profiles/blogs/augmented-reality-custom-geofencing-smart-rewind-and-more-in-new->>.

(Continued)

*Primary Examiner* — Brandon J Miller
(74) *Attorney, Agent, or Firm* — Alleman Hall Creasman & Tuttle LLP

(57) ABSTRACT

A geolocation home range for a user is managed. The user's geolocation is tracked and recorded periodically, as the user travels to different geolocations. An initial collection of geolocations is established, which defines the user's home range. Each of the geolocations corresponds to a micro-range for the user, which is a geo-fenced geographic region. When the user's current geolocation changes in a prescribed manner, the user's home range is modified based upon this change, or else the user is considered to be outside their home range.

20 Claims, 9 Drawing Sheets

(56) References Cited

U.S. PATENT DOCUMENTS

2015/0148061 A1    5/2015  Koukoumidis et al.
2016/0007156 A1    1/2016  Chiou et al.
2017/0142548 A1*   5/2017  Buskirk ................ H04W 4/021
2017/0289754 A1*  10/2017  Anderson ............... H04W 4/04

OTHER PUBLICATIONS

Barbeau, et al., "Travel assistance device: utilising global positioning system-enabled mobile phones to aid transit riders with special needs", IET Intelligent Transport Systems, Mar. 2010, pp. 12-23, vol. 4, Issue 1, The Institution of Engineering and Technology.

Pictometry International Corp., "Changing custom geofences", Aug. 5, 2016, pp. 1, Pictometry International Corp., retrieved at <<https://gisimagery.ci.boca-raton.fl.us/EFS/Webhelp/POL_WebHelp_SuperAdmin/Content/Adding%20and%20maintaining%20custom%20geofences/Changing%20custom%20geofences.htm>>.

Simply Made Apps, "How Automatic Updating Works", May 21, 2016, pp. 2, Simply Made Apps, retrieved at <<https://www.simpleinout.com/phones#howitworks>>.

* cited by examiner

MANAGING A USER'S GEOLOCATION HOME RANGE

BACKGROUND

The Internet is a global data communications system that serves billions of people across the globe and provides them access to a vast array of online information resources and services including those provided by the World Wide Web and intranet-based enterprises. Thanks to the ubiquity of the Internet and the wide variety of network-enabled end-user computing devices that exist today, people today spend a large and ever-increasing amount of time performing a wide variety of tasks online (e.g., using various types of end-user computing devices that are configured to operate over a data communication network such as the Internet, among other types of networks). Many of these end-user computing devices are mobile computing devices such as smartphones and tablet computers that include Global Positioning System (GPS) receiver technology and/or other geolocation technologies that can be used to identify and track the current geolocation (i.e., geographic location) of the mobile computing devices and thus each of the people who are carrying and utilizing them. Due to the ever-growing prevalence of such mobile computing devices today, a large and growing number of computing (e.g., software-based) applications currently exist that can determine the current geolocation of a given mobile computing device and then utilize this knowledge to provide the person who is carrying and utilizing the mobile computing device with a wide variety of geolocation-based services.

SUMMARY

Geolocation home range management technique implementations described herein generally involve managing a geolocation home range for a user. In one exemplary implementation a current geolocation of the user is continuously tracked as they travel to different geolocations. An initial geolocation home range for the user is established based upon this continuous tracking, where the initial geolocation home range for the user includes one or more geographically distinct geo-fenced geographic regions that are defined by the continuous tracking. Whenever the current geolocation of the user changes in a prescribed manner, the initial geolocation home range for the user is modified based upon this change.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the geolocation home range management technique implementations described herein will become better understood with regard to the following description, appended claims, and accompanying drawings where:

DETAILED DESCRIPTION

Figure 1:
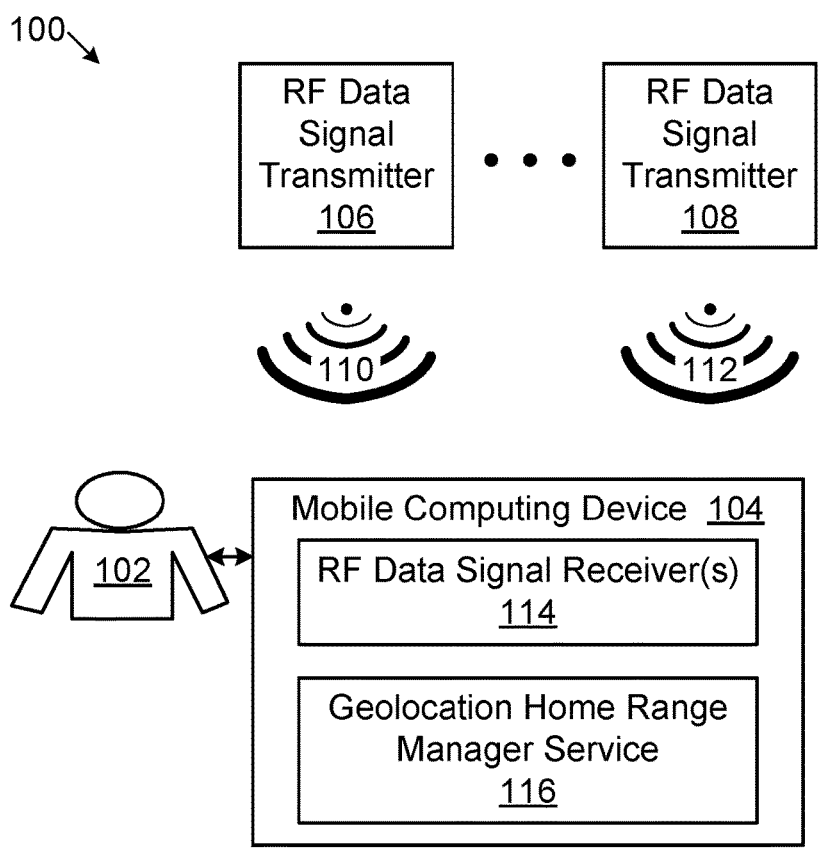
FIG. 1 is a diagram illustrating one implementation, in simplified form, of a system framework for realizing the geolocation home range management technique implementations described herein.

In the following description of geolocation home range management technique implementations reference is made to the accompanying drawings which form a part hereof, and in which are shown, by way of illustration, specific implementations in which the geolocation home range management technique can be practiced. It is understood that other implementations can be utilized and structural changes can be made without departing from the scope of the geolocation home range management technique implementations.

It is also noted that for the sake of clarity specific terminology will be resorted to in describing the geolocation home range management technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version", or "one variant", or "another variant", or an "exemplary variant", or an "alternate variant" means that a particular feature, a particular structure, or particular characteristics described in connection with the implementation/version/variant can be included in at least one implementation of the geolocation home range management technique. The appearances of the phrases "in one implementation", "in another implementation", "in an exemplary implementation", "in an alternate implementation", "in one version", "in another version", "in an exemplary version", "in an alternate version", "in one variant", "in another variant", "in an exemplary variant", and "in an alternate variant" in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants of the geolocation home range management technique does not inherently indicate any particular order nor imply any limitations of the geolocation home range management technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Geolocation

As is appreciated in the art of geolocation systems and methods, the term "geolocation" refers to a particular real-world geographic location. As such, the term "geolocation" is sometimes also used to refer to a set of geographic coordinates that specify a particular real-world geographic location. Various types of conventional geographic coordinate systems exist that may be used to specify a given geolocation. A popular exemplary geographic coordinate system uses conventional latitude and longitude metrics to specify a given two-dimensional (2D) geolocation, and may also add a conventional altitude (e.g., elevation) metric to specify a given three-dimensional (3D) geolocation. Another exemplary geographic coordinate system uses a set of conventional rectilinear Cartesian (e.g., (x,y) or (x,y,z)) coordinates to specify a given 2D or 3D geolocation. Yet another exemplary geographic coordinate system uses a set of conventional local East, North, Up (ENU) Cartesian coordinates to specify a given 3D geolocation. Yet another exemplary geographic coordinate system uses a set of conventional local North, East, Down (NED) Cartesian coordinates to specify a given 3D geolocation. Conventional map projection methods may be used to convert a given set of geographic coordinates to a particular location on a map.

As described heretofore, a wide variety of network-enabled end-user computing devices exist today. Many of these computing devices are mobile computing devices that include Global Positioning System (GPS) receiver technology and/or other geolocation technologies that can be used to identify and track the current geolocation of the mobile computing devices and thus each of the people who are carrying and utilizing them. Examples of such other geolocation technologies are described in more detail hereafter. The term "location-enabled mobile computing device" is used herein to refer to any type of conventional mobile computing device that includes GPS receiver technology and/or other geolocation technologies that can be used to identify and track the current geolocation of the computing device and thus each person who carries and utilizes it. Exemplary types of location-enabled mobile computing devices are also described in more detail hereafter. The term "user" is used herein to refer to a person who carries and utilizes a given location-enabled mobile computing device.

As also described heretofore, a large and growing number of computing (e.g., software-based) applications (hereafter sometimes simply referred to as applications) currently exist that can determine the current geolocation of a given location-enabled mobile computing device and then utilize this knowledge to provide the device's user with a wide variety of geolocation-based services. These applications are currently used in many different industries including security, ranging, e-retail, banking, entertainment, mapping, online gaming, social networking, healthcare, education, online search, travel, hospitality, fleet management, law enforcement, marketing, and advertising, among many others. For example, a mapping application may map a user's current geolocation, and then either present the map to the user or ask the user if they would like to download it. A social networking application may report a user's current geolocation to other people who are in the user's social network, thus telling these other people where they can find the user and allowing them to recommend places for the user to go or things for the user to do and see nearby. A search engine application may pro-actively provide a user with information content that is specifically relevant to the user's current geolocation. By way of example, the search engine application may notify the user about the different landmarks and restaurants that exist near the user's current geolocation. The search engine application may also provide the user with news updates, upcoming events, and promotional offers that correspond to the user's current geolocation.

2.0 Managing a User's Geolocation Home Range

The geolocation home range management technique implementations described herein generally automatically establish a geolocation home range for a user, and then automatically modify (e.g., update/revise) this home range as the user dynamically travels to different geolocations during their daily activities, where these different geolocations may be anywhere in the world. In other words, and as will be appreciated from the more-detailed description that follows, the geolocation home range management technique implementations continuously monitor the user's travel patterns and dynamically update the user's home range, or establish a new home range for the user, based on the user's travel patterns. The term "geolocation home range" is used herein to refer to one or more geographically distinct geo-fenced real-world geographic regions (e.g., territories) that are traversed by the user as they dynamically travel to different geolocations during their daily activities. As is appreciated in the art of geolocation systems and methods, the term "geo-fence" refers to a virtual perimeter that surrounds (and thus designates) a specific real-world geographic region.

The geolocation home range management technique implementations described herein are advantageous for various reasons including, but not limited to, the following. As will be appreciated from the foregoing and the more-detailed description that follows, the geolocation home range management technique implementations are operable with any type of location-enabled mobile computing device examples of which are described in more detail hereafter. The geolocation home range management technique implementations may also be employed by any computing application that offers one or more geolocation-based services to a user, where these services may be tailored to many different industries such as those described heretofore. For example, the geolocation home range management technique implementations may be employed by a given application to provide a user with proactive experiences that are specifically adapted/tailored to the user's current geolocation and their travel patterns. More particularly and by way of example but not limitation, a personal assistant application may be configured to trigger and prompt the user in a prescribed manner when they move into or out of their geolocation home range. For example, when the user is returning from vacation and travels back into their home range, the personal assistant application may remind the user to call their mother to say happy birthday when they get home). When the user leaves their home range and goes on vacation, a mapping application may prompt the user to download an offline map for the geolocation in which they are currently vacationing.

Additionally, a tested implementation of the geolocation home range management technique described herein is currently realized in the conventional City Art Search mobile computing application that helps a user find out where famous works of art are housed around the world. When the user is running the City Art Search application on their location-enabled mobile computing device and they are within their geolocation home range, the application periodically (e.g., a prescribed number of times a day) refreshes the "lock screen" of the user's computing device with one of over 7,500 famous works of art. When the user is traveling in a region that is outside of their geolocation home range (e.g., the user is on vacation, or is visiting a friend in a different city, or the like), the application will determine the current geolocation of the user, identify each of the famous works of art that are nearby this current location, and then periodically refresh the "lock screen" of the user's computing device with one of the identified works of art, which may incentivize the user to go to see the identified works of art in person.

FIG. 1 illustrates one implementation, in simplified form, of a system framework for realizing the geolocation home range management technique implementations described herein. As exemplified in FIG. 1, the system framework 100 includes a location-enabled mobile computing device 104 that is carried and utilized by a user 102 to perform a wide variety of tasks. The computing device 104 can be any type of conventional location-enabled mobile computing device such as a smartphone, or a tablet computer, or a laptop computer (sometimes also referred to as a notebook or netbook computer), or a computing device that is integrated into an automobile, among other types of conventional location-enabled mobile computing devices. In an exemplary implementation of the geolocation home range management technique described herein the computing device 104 includes one or more conventional RF (radio frequency) data signal receivers 114 that are configured to receive RF data signals 110/112 which are routinely transmitted from one or more conventional RF data signal transmitters 106/108. It is noted that in the geolocation home range management technique implementations the computing device 104 may receive various types of RF data signals 110/112 from various types of RF data signal transmitters 106/108. Exemplary types of RF data signals 110/112 and transmitters 106/108 are described in more detail hereafter.

Referring again to FIG. 1, the location-enabled mobile computing device 104 processes the RF data signals 110/112 that are transmitted from the RF data signal transmitters 106/108 to routinely (e.g., every prescribed interval of time) determine a geolocation data point (e.g., a set of geographic coordinates) that specifies the current geolocation of the computing device 104 and thus the user 102 who is carrying it. The system framework 100 also includes a geolocation home range manager service 116 that runs on the computing device 104. As will also be described in more detail hereafter, this manager service 116 generally performs a variety of functions associated with utilizing the just-described geolocation data point that is routinely determined to manage the user's 102 geolocation home range as they travel to different geolocations during their daily activities, where these geolocations may be anywhere in the world.

Referring again to FIG. 1, in one implementation of the geolocation home range management technique described herein the RF data signal receiver(s) 114 include a conventional GPS receiver (not separately shown) and the RF data signal transmitters 106/108 include a constellation of conventional GPS satellites (not separately shown) that orbit the earth. In another implementation of the geolocation home range management technique the RF data signal receiver(s) 114 include a conventional cellular signal receiver (not separately shown) and the RF data signal transmitters 106/108 include conventional cellular signal transmitters (e.g., cellular base station transceivers, or the like) each of which has a known static (e.g., fixed) geolocation and is in the vicinity of the location-enabled mobile computing device 104. In yet another implementation of the geolocation home range management technique the RF data signal receiver(s) 114 include a conventional Wi-Fi signal receiver (not separately shown) and the RF data signal transmitters 106/108 include conventional Wi-Fi signal transmitters (e.g., Wi-Fi routers, or the like) each of which has a known static geolocation and is in the vicinity of the computing device 104.

Figure 2:
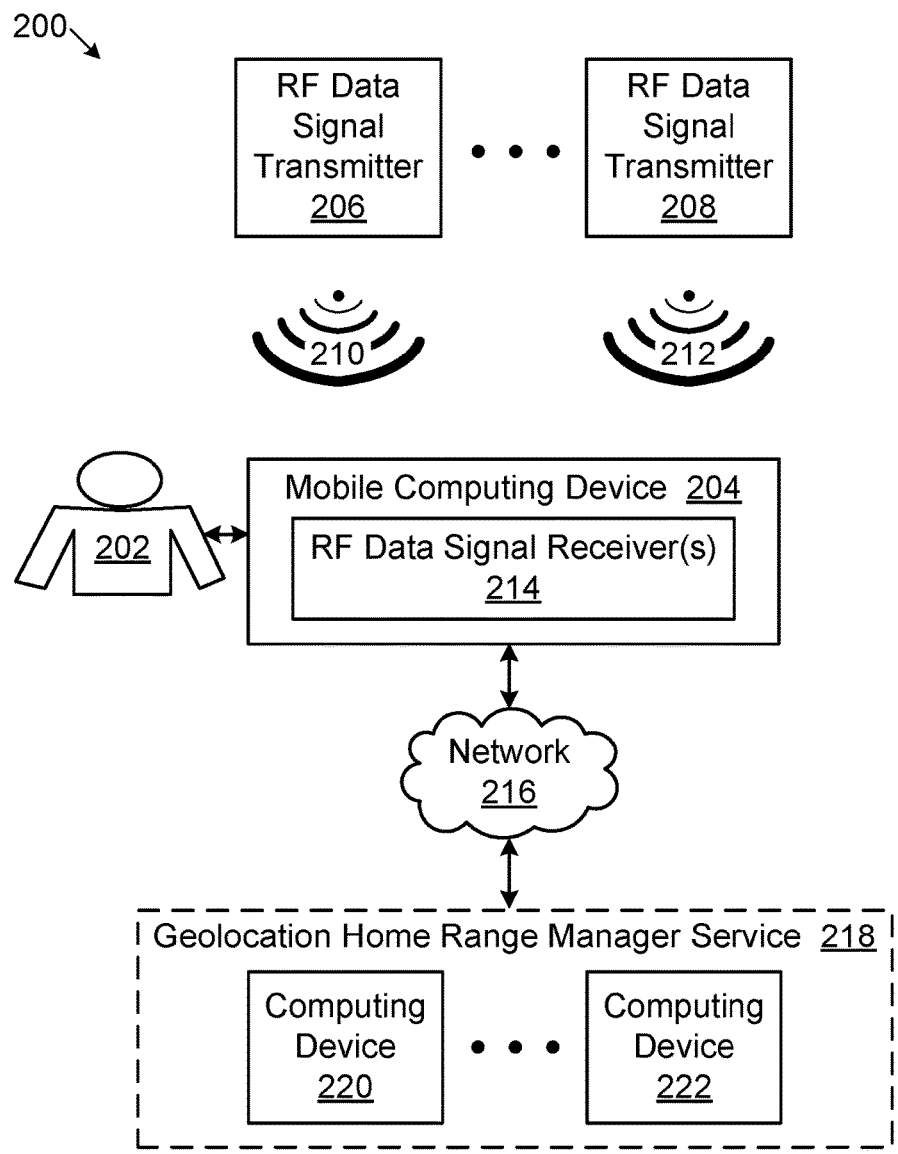
FIG. 2 is a diagram illustrating another implementation, in simplified form, of a system framework for realizing the geolocation home range management technique implementations described herein.

FIG. 2 illustrates another implementation, in simplified form, of a system framework for realizing the geolocation home range management technique implementations described herein. As exemplified in FIG. 2, the system framework 200 includes the aforementioned location-enabled mobile computing device 204 that is carried and utilized by a user 202 to perform a wide variety of tasks. The computing device 204 includes the aforementioned one or more RF data signal receivers 214 that are configured to receive the aforementioned RF data signals 210/212 which are routinely transmitted from the aforementioned one or more RF data signal transmitters 206/208. The computing device 204 is configured to communicate over a conventional data communication network 216 (herein also referred to as a computer network) such as the Internet (among other types of conventional data communication networks) with a geolocation home range manager service 218 that operates (e.g., runs) on one or more other computing devices 220/222. These other computing devices 220/222 can also communicate with each other via the network 216. In an exemplary implementation of the geolocation home range management technique described herein the other computing devices 220/222 are located in the cloud so that the geolocation home range manager service 218 operates as a cloud service and the network 216 includes wide area network functionality. The term "cloud service" is used herein to refer to a web application that operates in the cloud and can be hosted on (e.g., deployed at) a plurality of data centers that can be located in different geographic regions (e.g., different regions of the world). As will also be described in more detail hereafter, the geolocation home range manager service 218 generally performs a variety of functions associated with utilizing the aforementioned geolocation data point that is routinely determined to manage the user's 202 geolocation home range as they travel to different geolocations during their daily activities, where these geolocations may be anywhere in the world.

Figure 3:
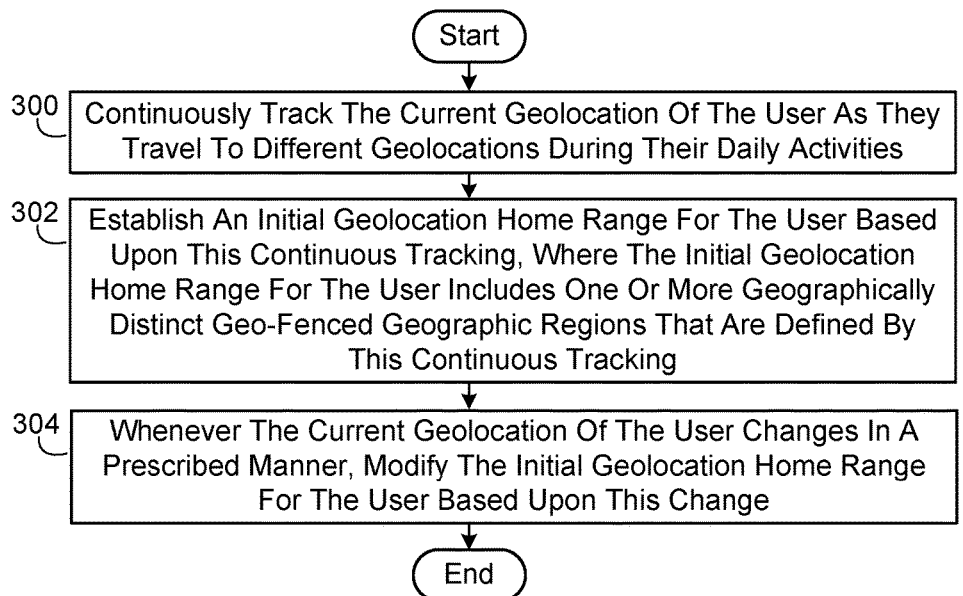
FIG. 3 is a flow diagram illustrating an exemplary implementation, in simplified form, of a process for managing the geolocation home range of a user.

FIG. 3 illustrates an exemplary implementation, in simplified form, of a process for managing the geolocation home range of a user. In one implementation of the geolocation home range management technique described herein the process illustrated in FIG. 3 is realized on the system framework 100 illustrated in FIG. 1. In another implementation of the geolocation home range management technique the process illustrated in FIG. 3 is realized on the system framework 200 illustrated in FIG. 2. As exemplified in FIG. 3 the process starts with continuously tracking the current geolocation of the user as they travel to different geolocations during their daily activities (process action 300). While the user's current geolocation is being tracked (action 300), an initial geolocation home range for the user is established based upon this tracking, where the initial geolocation home range for the user includes one or more geographically distinct geo-fenced geographic regions that are defined by this tracking (process action 302). Then, whenever the current geolocation of the user changes in a prescribed manner, the initial geolocation home range for the user is modified based upon this change (process action 304). It is noted that the geolocation home range management technique implementations described herein can accommodate any manner of change in the user's current geolocation, several examples of which are described in more detail hereafter.

Given the foregoing and referring again to FIG. 3, it will be appreciated that the just-described establishment and subsequent dynamic modification of a geolocation home range for the user (actions 302 and 304 respectively) based upon a continuous tracking of the user's current geolocation (action 300) has the advantageous technical effect of being able to be utilized by a given mobile computing application to pro-actively provide a prescribed type(s) of information content to the user that is contextually related to their current geolocation home range. Examples of such information content include maps, the aforementioned artwork, upcoming events, landmarks, restaurants, weather reports, and emergency alerts, among many other types of information content. It will also be appreciated that the user's geolocation home range is established and dynamically modified based solely on the continuous tracking of the user's current geolocation—no other data (such as crowd-source data or the like) is needed to establish and modify the user's geolocation home range. It will also be appreciated that the just-described continuous tracking of the user's current geolocation (action 300) may be performed in a variety of ways, several examples of which will now be described in more detail.

Figure 4:
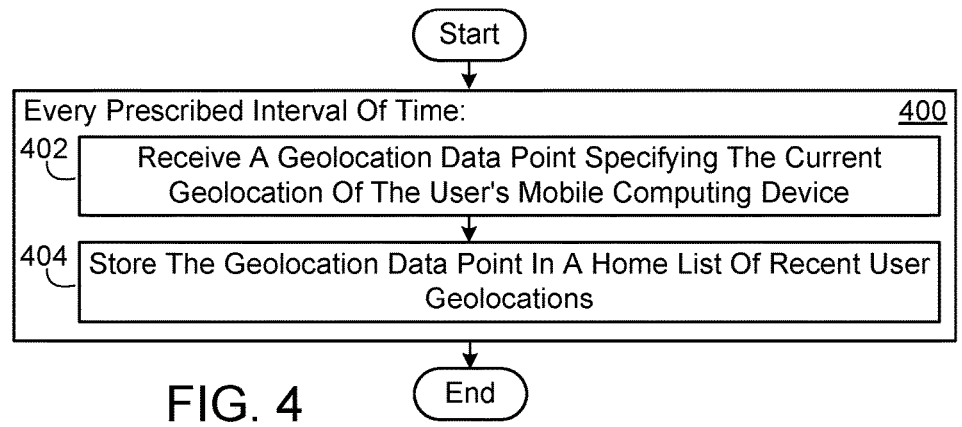
FIG. 4 is a flow diagram illustrating an exemplary implementation, in simplified form, of a process for continuously tracking the current geolocation of the user as they travel to different geolocations during their daily activities.

FIG. 4 illustrates an exemplary implementation, in simplified form, of a process for continuously tracking the current geolocation of the user as they travel to different geolocations during their daily activities. In other words, FIG. 4 illustrates an exemplary implementation of the action 300 shown in FIG. 3. As exemplified in FIG. 4, the process operates as follows. Every prescribed interval of time (process action 400), a geolocation data point is received that specifies the current geolocation of the aforementioned mobile computing device that is carried and utilized by the user (process action 402), and this data point is stored (e.g., recorded) in a home list of recent user geolocations (process action 404). In the aforementioned tested implementation of the geolocation home range management technique described herein the prescribed interval of time was six hours. Other implementations of the geolocation home range management technique are also possible where the prescribed interval of time is either less than six hours or greater than six hours.

As described heretofore and referring again to FIG. 4, various types of conventional geographic coordinate systems exist that may be used to specify a given geolocation. In the tested implementation of the geolocation home range management technique described herein the geolocation data point that is received in action 402 includes the aforementioned latitude and longitude metrics that collectively specify a particular 2D geolocation. In another implementation of the geolocation home range management technique the geolocation data point received in action 402 includes the aforementioned latitude, longitude and altitude metrics that collectively specify a particular 3D geolocation. In yet another implementation of the geolocation home range management technique the geolocation data point received in action 402 includes the aforementioned set of rectilinear Cartesian (e.g., (x,y)) coordinates that specifies a particular 2D geolocation. In yet another implementation of the geolocation home range management technique the geolocation data point received in action 402 includes the aforementioned set of rectilinear Cartesian (e.g., (x,y,z)) coordinates that specifies a particular 3D geolocation. In yet another implementation of the geolocation home range management technique the geolocation data point received in action 402 includes the aforementioned set of ENU Cartesian coordinates that specifies a particular 3D geolocation. In yet another implementation of the geolocation home range management technique the geolocation data point received in action 402 includes the aforementioned set of NED Cartesian coordinates that specifies a particular 3D geolocation.

Figure 5:
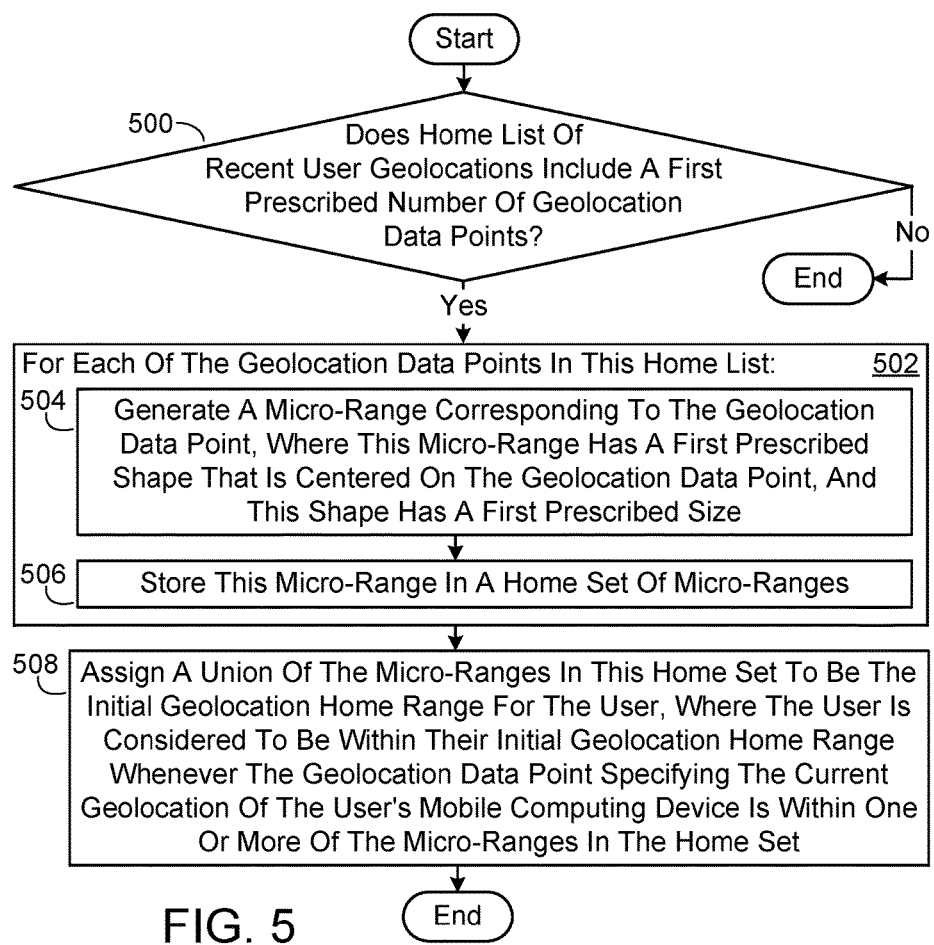
FIG. 5 is a flow diagram illustrating an exemplary implementation, in simplified form, of a process for establishing an initial geolocation home range for the user based upon the just-described continuous tracking of the user's current geolocation.

FIG. 5 illustrates an exemplary implementation, in simplified form, of a process for establishing an initial geolocation home range for the user based upon the continuous tracking of the user's current geolocation that is performed in action 300 shown in FIG. 3. As exemplified in FIG. 5, the process operates as follows. Whenever the home list of recent user geolocations includes a first prescribed number of geolocation data points (process action 500, Yes), the following actions are performed for each of the geolocation data points in this home list (process action 502). A micro-range corresponding to the geolocation data point is generated, where this micro-range has a first prescribed shape that is centered on the geolocation data point, and the first prescribed shape has a first prescribed size (process action 504). This micro-range is then stored in a home set of micro-ranges (process action 506). After a micro-range has been generated for each of the geolocation data points in the home list of recent user geolocations and these micro-ranges have been stored in the home set of micro-ranges (action 502), a union of the micro-ranges in this home set is assigned to be the initial geolocation home range for the user, where the user is considered to be within their initial geolocation home range whenever the geolocation data point specifying the current geolocation of the user's mobile computing device is within one or more of the micro-ranges in the home set (process action 508).

In the tested implementation of the geolocation home range management technique described herein the just-described first prescribed number of geolocation data points was 40 geolocation data points. In other words, in the aforementioned case where the prescribed interval of time is six hours, 40 geolocation data points corresponds to the user being tracked for a period of ten days. Other implementations of the geolocation home range management technique are also possible where the first prescribed number of geolocation data points is either less than 40 or greater than 40 geolocation data points. In this tested implementation the just-described first prescribed shape was a circle and the just-described first prescribed size of this circle was a radius of 29 kilometers. Other implementations of the geolocation home range management technique are also possible where the circular micro-range has radius of either less than 29 kilometers or greater than 29 kilometers. Other implementations of the geolocation home range management technique are also possible where the first prescribed shape is any other shape besides a circle.

Referring again to FIG. 5, it is noted that while a majority of the micro-ranges in the home set of micro-ranges that is generated in action 502 may generally overlap one or more of the other micro-ranges in this home set, it is possible that one or more of the micro-ranges in the home set may not overlap any of the other micro-ranges in the home set. For example, consider the case where the user lives in Bellevue, Wash., and the user works weekdays in Redmond, Wash., and the user spends a weekend visiting a friend who lives in Kirkland, Wash. In this case, in the aforementioned tested implementation where the prescribed interval of time was six hours, the first prescribed number of geolocation data points was 40 geolocation data points, the first prescribed shape of each micro-range was a circle, and the first prescribed size of this shape was a radius of 29 kilometers, the user's initial geolocation home range would include a first micro-range centered on Bellevue, a second micro-range centered on Redmond, and a third micro-range centered on Kirkland, and each of these three micro-ranges would overlap the other two micro-ranges. Now consider an alternate version of the just-described case where the user makes an overnight work-related trip to Boston, Mass., where the user flies to Boston on Tuesday afternoon, the user sleeps in a hotel in Boston on Tuesday night, the user has a six hour meeting in Boston on Wednesday, and the user flies back home on Wednesday night. In this alternate version the user's initial geolocation home range would also include a fourth micro-range centered on Boston which would obviously not overlap with the first, second or third micro-ranges.

Figure 6:
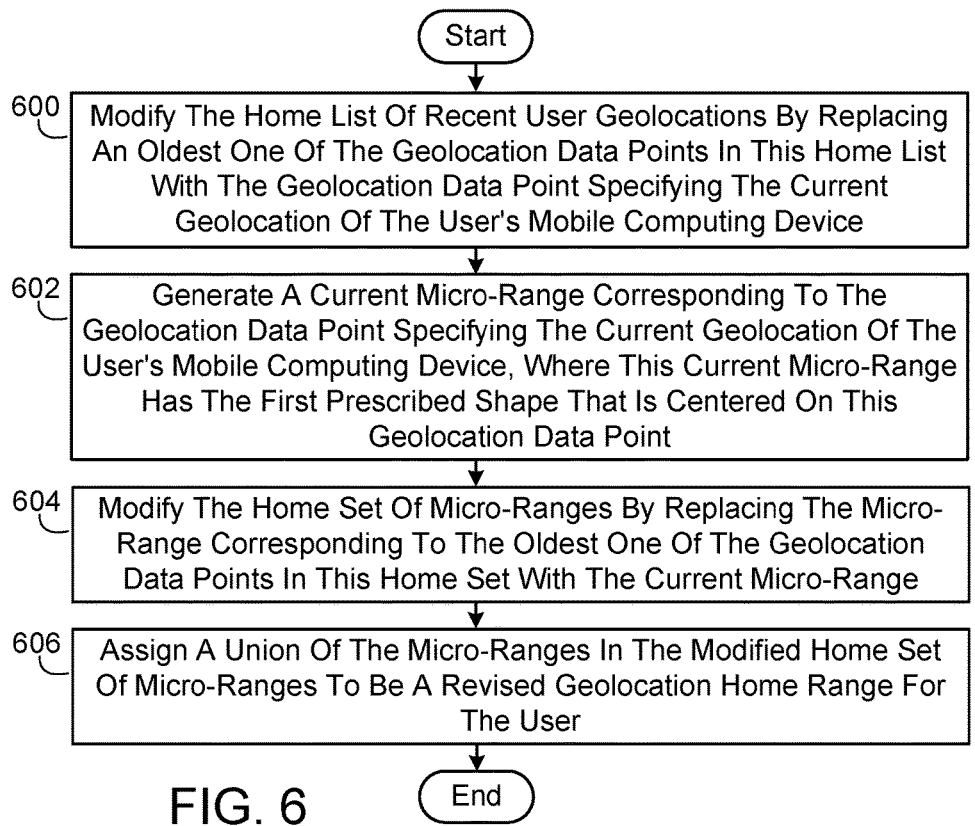
FIG. 6 is a flow diagram illustrating an exemplary implementation, in simplified form, of a process for modifying the initial geolocation home range for the user in the case where a geolocation data point specifying the user's current geolocation is within the initial geolocation home range for the user.

FIG. 6 illustrates an exemplary implementation, in simplified form, of a process for modifying the initial geolocation home range for the user in the case where the geolocation data point specifying the current geolocation of the user's mobile computing device is within the initial geolocation home range for the user (e.g., within one or more of the micro-ranges in the home set of micro-ranges that is generated in action 502). In other words, FIG. 6 illustrates an exemplary implementation of the action 304 shown in FIG. 3 in the case where the prescribed manner of change in the user's current geolocation is the geolocation data point specifying the current geolocation of the user's mobile computing device being within the initial geolocation home range for the user. As exemplified in FIG. 6, the process starts with modifying the home list of recent user geolocations by replacing an oldest one of the geolocation data points in this home list with the geolocation data point specifying the current geolocation of the user's mobile computing device (process action 600). A current micro-range corresponding to the geolocation data point specifying the current geolocation of the user's mobile computing device is then generated, where this current micro-range has the aforementioned first prescribed shape that is centered on this geolocation data point (process action 602). The home set of micro-ranges is then modified by replacing the micro-range corresponding to the oldest one of the geolocation data points in this home set with the current micro-range (process action 604). A union of the micro-ranges in the modified home set of micro-ranges is then assigned to be a revised geolocation home range for the user (process action 606).

It will be appreciated that in the case where the user increases their commute distance (e.g., increases the distance they travel between their home and work—which may happen in a situation where the user moves to a new home that is farther from their work location than their old home was, or in another situation where the user begins working in a new location that is farther from their home than their old work location was), the process illustrated in FIG. 6 will generate a revised geolocation home range that is an expanded version of the initial geolocation home range and accommodates this increased commute distance. In the case where the user decreases their commute distance (e.g., decreases the distance they travel between their home and work—which may happen in a situation where the user moves to a new home that is closer to their work location than their old home was, or in another situation where the user begins working in a new location that is closer to their home than their old work location was), the process illustrated in FIG. 6 will generate a revised geolocation home range that is a shrunken version of the initial geolocation home range and accommodates this decreased commute distance. It will also be appreciated that in both of the just-described cases, the geolocation data point corresponding to the user's old home, or the geolocation data point corresponding to the user's old work location, will eventually disappear from the home list of recent geolocations.

Figure 7:
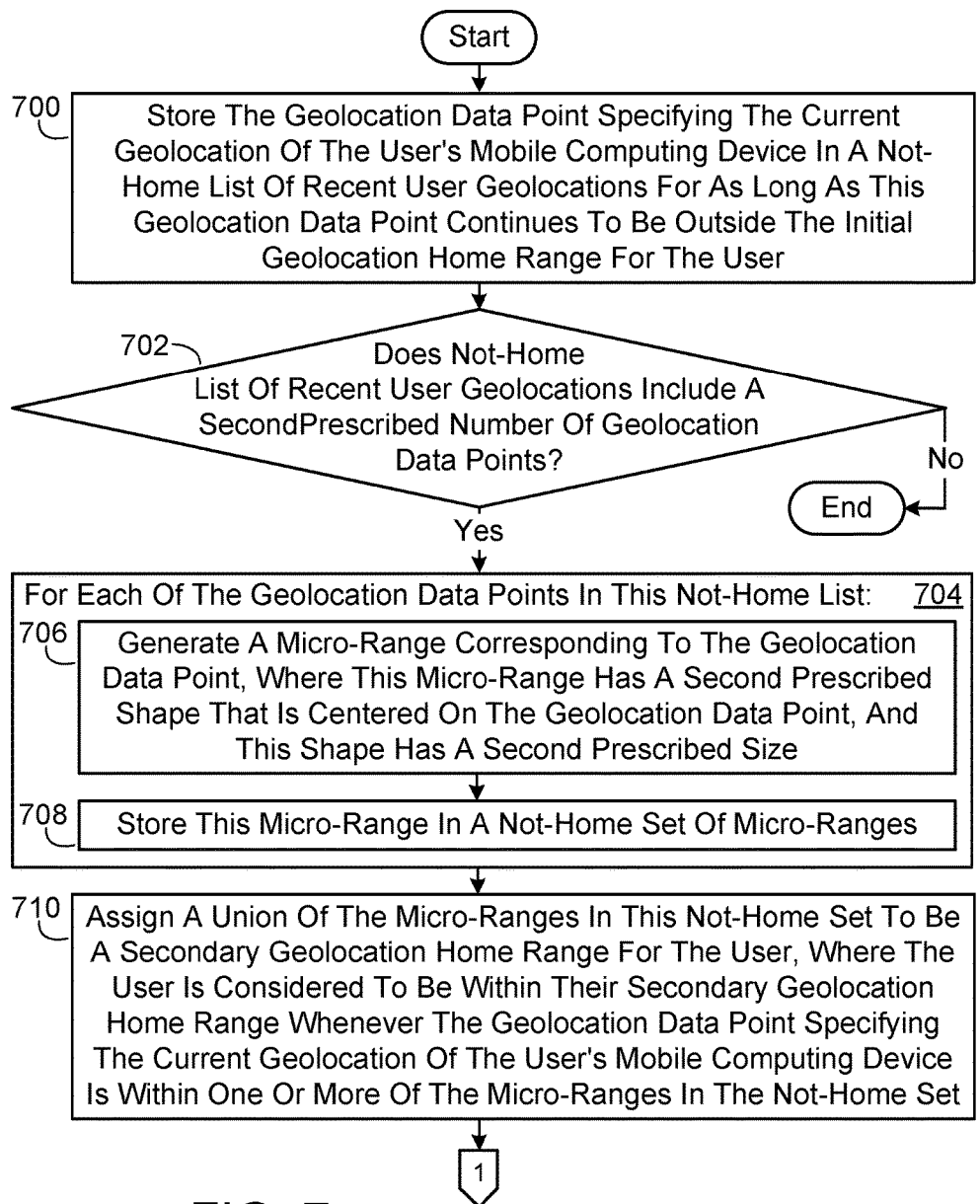
FIGS. 7 and 8 are a flow diagram illustrating an exemplary implementation, in simplified form, of a process for modifying the initial geolocation home range for the user in the case where the geolocation data point specifying the user's current geolocation is outside the initial geolocation home range for the user.
Figure 8:
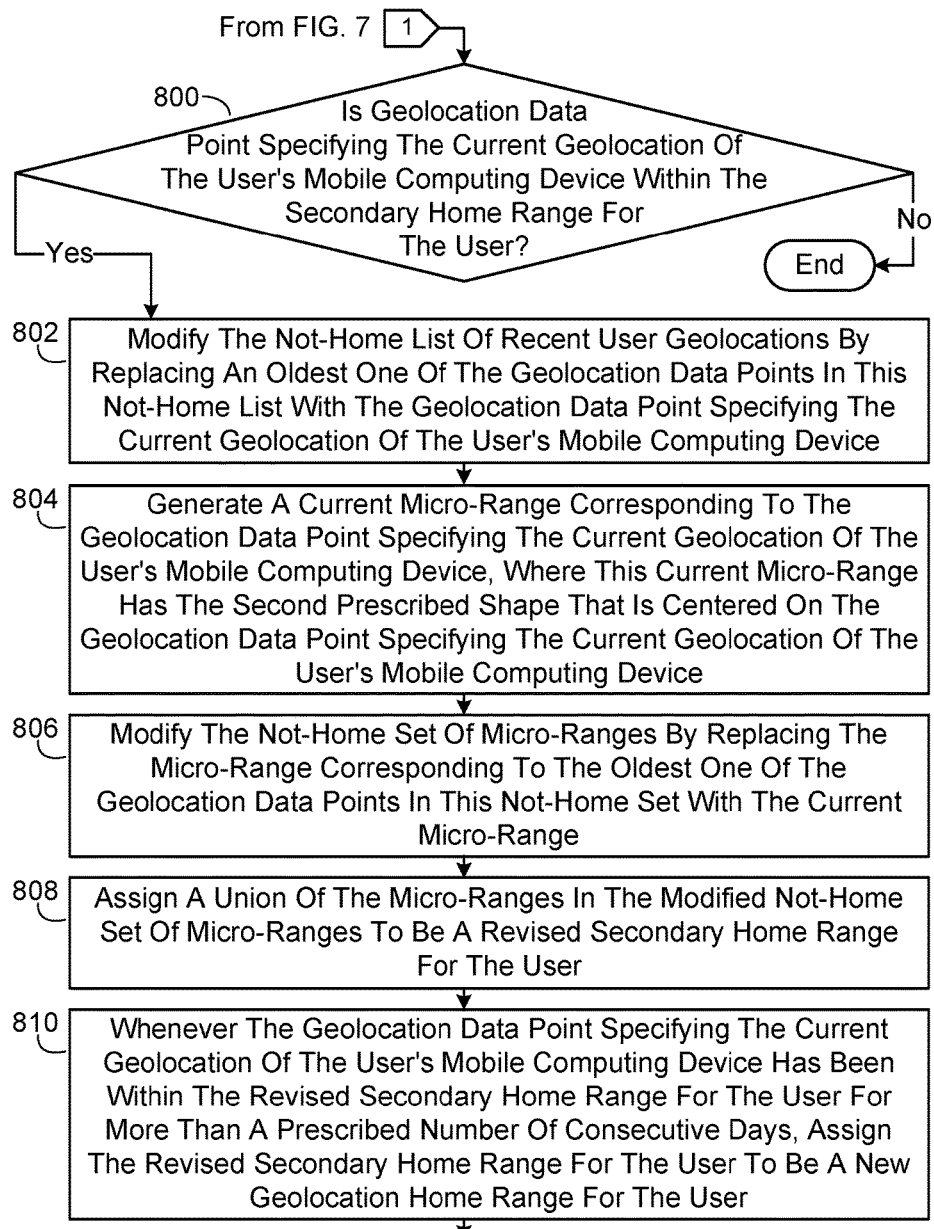

FIGS. 7 and 8 illustrate an exemplary implementation, in simplified form, of a process for modifying the initial geolocation home range for the user in the case where the geolocation data point specifying the current geolocation of the user's mobile computing device is outside the initial geolocation home range for the user (e.g., outside all of the micro-ranges in the home set of micro-ranges that is generated in action 502). In other words, FIGS. 7 and 8 illustrate an exemplary implementation of the action 304 shown in FIG. 3 in the case where the prescribed manner of change in the user's current geolocation is the geolocation data point specifying the current geolocation of the user's mobile computing device being outside the initial geolocation home range for the user. As exemplified in FIG. 7, the process starts with storing the geolocation data point specifying the current geolocation of the user's mobile computing device in a not-home list of recent user geolocations for as long as this geolocation data point continues to be outside the initial geolocation home range for the user (process action 700). Whenever the not-home list of recent user geolocations includes a second prescribed number of geolocation data points (process action 702, Yes), the following actions are performed for each of the geolocation data points in this not-home list (process action 704). A micro-range corresponding to the geolocation data point is generated, where this micro-range has a second prescribed shape that is centered on the geolocation data point, and this shape has a second prescribed size (process action 706). This micro-range is then stored in a not-home set of micro-ranges (process action 708). After a micro-range has been generated for each of the geolocation data points in the not-home list of recent user geolocations and these micro-ranges have been stored in the not-home set of micro-ranges (action 704), a union of the micro-ranges in this not-home set is assigned to be a secondary geolocation home range for the user, where the user is considered to be within their secondary geolocation home range whenever the geolocation data point specifying the current geolocation of the user's mobile computing device is within one or more of the micro-ranges in the not-home set (process action 710).

As exemplified in FIG. 8, whenever the geolocation data point specifying the current geolocation of the user's mobile computing device is within the secondary home range for the user (process action 800, Yes), the following actions are performed. The not-home list of recent user geolocations is modified by replacing an oldest one of the geolocation data points in this not-home list with the geolocation data point specifying the current geolocation of the user's mobile computing device (process action 802). A current micro-range corresponding to the geolocation data point specifying the current geolocation of the user's mobile computing device is then generated, where this current micro-range has the second prescribed shape that is centered on the geolocation data point specifying the current geolocation of the user's mobile computing device (process action 804). The not-home set of micro-ranges is then modified by replacing the micro-range corresponding to this oldest one of the geolocation data points in this not-home set with the current micro-range (process action 806). A union of the micro-ranges in the modified not-home set of micro-ranges is then assigned to be a revised secondary home range for the user (process action 808). Whenever the geolocation data point specifying the current geolocation of the user's mobile computing device has been within the revised secondary home range for the user for more than a prescribed number of consecutive days, the revised secondary home range for the user is assigned to be a new geolocation home range for the user (process action 810).

In the tested implementation of the geolocation home range management technique described herein the just-described second prescribed number of geolocation data points was the same as the first prescribed number geolocation data points, the just-described second prescribed shape was the same as the first prescribed shape, and the just-described second prescribed size was the same as the first prescribed size. Other implementations of the geolocation home range management technique are also possible where the second prescribed number of geolocation data points is different than the first prescribed number of geolocation data points, the second prescribed shape is different than the first prescribed shape, and the second prescribed size is different than the first prescribed size. In this tested implementation the just-described prescribed number of consecutive days was 31 consecutive days. Other implementations of the geolocation home range management technique are also possible where the prescribed number of consecutive days is either less than or greater than 31 consecutive days.

It will be appreciated that in the case where the user goes on vacation after the initial geolocation home range for the user has been established and the user returns home from their vacation in less than the prescribed number of consecutive days, the process illustrated in FIGS. 7 and 8 will leave this initial geolocation home range unchanged, and rather will establish and maintain the just-described secondary home range for the user, where this secondary home range includes one or more geo-fenced geographic regions that encompass the particular geolocation(s) where the user vacationed. Similarly, in the case where the user starts to regularly (e.g., once a week, or once a month, or the like) travel to a particular geolocation that is outside the initial geolocation home range for the user after it has been established (e.g., the user may begin to regularly travel to a new city for work, or to visit a new friend who lives in the new city, or to visit a family member who recently moved to the new city, or the like), the process illustrated in FIGS. 7 and 8 will also leave this initial geolocation home range unchanged, and rather will establish and maintain a secondary home range for the user that includes a geo-fenced geographic region which encompasses this particular geo-location. In the case where the user permanently moves to a particular geolocation that is outside the initial geolocation home range for the user (e.g., the user moves their home to a new city), the process illustrated in FIGS. 7 and 8 will eventually establish a new geolocation home range for the user (e.g., will change the user's geolocation home range) based upon this move, where this new geolocation home range includes a new geo-fenced geographic region that encompasses this particular geolocation.

In the tested implementation of the geolocation home range management technique described herein the action of storing the geolocation data point specifying the current geolocation of the user's mobile computing device in a not-home list of recent user geolocations for as long as this geolocation data point continues to be outside the initial geolocation home range for the user (action 700) includes the action of setting an on vacation indicator to true, thus indicating that the user is currently on vacation. Correspondingly, in this tested implementation the action of assigning the revised secondary home range for the user to be a new geolocation home range for the user (action 810) includes the action of setting the on vacation indicator to false, thus indicating that the user has permanently moved to a geolocation that is within this new geolocation home range. The on vacation indicator can be utilized by a given mobile computing application to pro-actively provide the user with information content that is contextually related to the geolocation in which they are currently vacationing.

Figure 9:
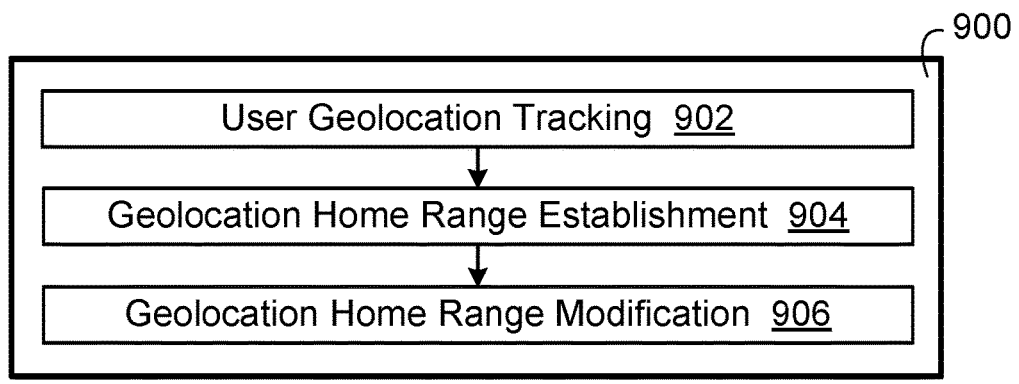
FIG. 9 is a diagram illustrating an exemplary implementation, in simplified form, of a geolocation home range manager computer program.

FIG. 9 illustrates an exemplary implementation, in simplified form, of a geolocation home range manager computer program. As exemplified in FIG. 9 and referring again to FIG. 3, the geolocation home range manager computer program 900 includes, but is not limited to, a user geolocation tracking sub-program 902 that performs action 300, a geolocation home range establishment sub-program 904 that performs action 302, and a geolocation home range modification sub-program 906 that performs action 304. Each of the just-described sub-programs is realized on a computing device such as that which is described in more detail in the Exemplary Operating Environments section which follows. More particularly and by way of example but not limitation, and referring again to FIGS. 1 and 2, in one implementation of the geolocation home range management technique described herein the just-described sub-programs may be realized on the location-enabled mobile computing device 104. In another implementation of the geolocation home range management technique the just-described sub-programs may be realized on the computing devices 220/222.

3.0 Other Implementations

While the geolocation home range management technique has been described by specific reference to implementations thereof, it is understood that variations and modifications thereof can be made without departing from the true spirit and scope of the geolocation home range management technique. By way of example but not limitation, consider the case where the user's location-enabled mobile computing device either does not include a GPS receiver or it does include a GPS receiver but this receiver is not functioning properly. If the user's computing device includes a cellular signal receiver then this device may use information that the cellular signal receiver receives from the aforementioned cellular signal transmitters that are in the vicinity of the device to approximate the current geolocation of the device using conventional triangulation methods. If the user's computing device includes a Wi-Fi signal receiver then this device may use information that the Wi-Fi signal receiver receives from the aforementioned Wi-Fi signal transmitters that are in the vicinity of the device to approximate the current geolocation of the device using conventional triangulation methods. In the case where the user's computing device includes a GPS receiver that is functioning properly along with a cellular signal receiver and/or a Wi-Fi signal receiver, this device may also employ conventional Assisted GPS (A-GPS) methods to determine the current geolocation of the device.

It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Exemplary Operating Environments

Figure 10:
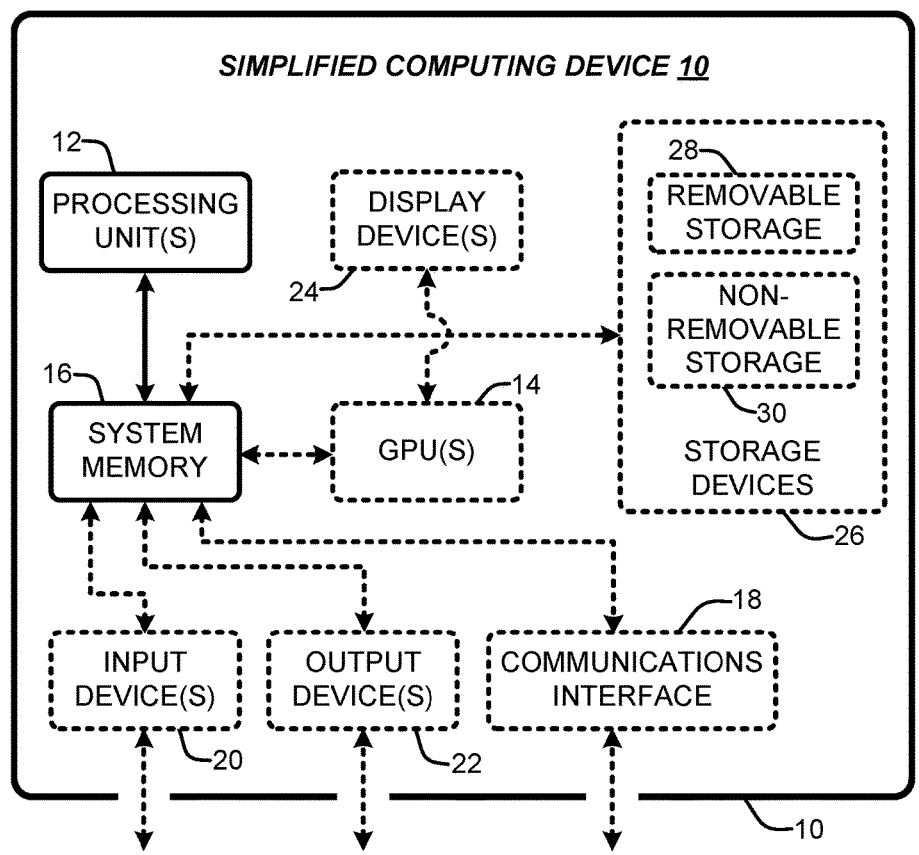
FIG. 10 is a diagram illustrating a simplified example of a general-purpose computer system on which various implementations and elements of the geolocation home range management technique, as described herein, may be realized.

The geolocation home range management technique implementations described herein are operational within numerous types of general purpose or special purpose computing system environments or configurations. FIG. 10 illustrates a simplified example of a general-purpose computer system on which various implementations and elements of the geolocation home range management technique, as described herein, may be implemented. It is noted that any boxes that are represented by broken or dashed lines in the simplified computing device 10 shown in FIG. 10 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the geolocation home range management technique implementations described herein, the device should have a sufficient computational capability and system memory to enable basic computational operations. In particular, the computational capability of the simplified computing device 10 shown in FIG. 10 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions such as the aforementioned the RF data signal receiver(s), and the like) or any combination of such devices.

Similarly, various interactions with the simplified computing device 10 and with any other component or feature of the geolocation home range management technique implementations described herein, including input, output, control, feedback, and response to one or more users or other devices or systems associated with the geolocation home range management technique implementations, are enabled by a variety of Natural User Interface (NUI) scenarios. The NUI techniques and scenarios enabled by the geolocation home range management technique implementations include, but are not limited to, interface technologies that allow one or more users user to interact with the geolocation home range management technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the geolocation home range management technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the geolocation home range management technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 10 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various geolocation home range management technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The geolocation home range management technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The geolocation home range management technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A geolocation home range management system, comprising:
    a geolocation home range manager comprising a mobile computing device that is carried by a user, and a computer program having a plurality of sub-programs executable by said computing device, wherein the sub-programs configure said computing device to,
    continuously track a current geolocation of the user as they travel to different geolocations,
    based upon said continuous tracking, establish an initial geolocation home range for the user with a union of a plurality of two-dimensional micro-ranges, wherein each of the two-dimensional micro-ranges is defined by said continuous tracking and corresponds to a particular geolocation the user traveled to, wherein the plurality of two-dimensional micro-ranges define one or more geographically distinct geo-fenced geographic regions, and
    whenever the current geolocation of the user changes in a prescribed manner, modify the initial geolocation home range for the user based upon said change.

2. The system of claim 1, wherein the sub-program for continuously tracking a current geolocation of the user as they travel to different geolocations comprises a sub-program for, every prescribed interval of time,
    receiving a geolocation data point specifying the current geolocation of said computing device, and
    storing the geolocation data point in a home list of recent user geolocations.

3. The system of claim 2, wherein the prescribed interval of time is six hours.

4. The system of claim 2, wherein the geolocation data point comprises one of:
    a latitude metric and a longitude metric that collectively specify a particular two-dimensional geolocation; or
    a latitude metric, a longitude metric, and an altitude metric that collectively specify a particular three-dimensional geolocation.

5. The system of claim 2, wherein the geolocation data point comprises one of:
    a set of rectilinear Cartesian coordinates that specifies a particular two-dimensional geolocation; or
    a set of rectilinear Cartesian coordinates that specifies a particular three-dimensional geolocation; or
    a set of local East, North, Up (ENU) Cartesian coordinates that specifies a particular three-dimensional geolocation; or
    a set of local North, East, Down (NED) Cartesian coordinates that specifies a particular three-dimensional geolocation.

6. The system of claim 2, wherein the sub-program for establishing an initial geolocation home range for the user based upon said continuous tracking comprises a sub-program for, whenever the home list of recent user geolocations comprises a prescribed number of geolocation data points,
    for each of the geolocation data points in said home list,
        generating a micro-range corresponding to the geolocation data point, said micro-range having a prescribed shape that is centered on the geolocation data point, the prescribed shape having a prescribed size, and
        storing said micro-range in a home set of micro-ranges, and
    assigning a union of the micro-ranges in said home set to be the initial geolocation home range for the user, wherein the user is considered to be within their initial geolocation home range whenever the geolocation data point specifying the current geolocation of said computing device is within one or more of the micro-ranges in said home set.

7. The system of claim 6, wherein the prescribed number of geolocation data points is 40 geolocation data points.

8. The system of claim 6, wherein the prescribed shape is a circle, and the prescribed size is a radius of 29 kilometers.

9. The system of claim 6, wherein the prescribed manner comprises the geolocation data point specifying the current geolocation of said computing device being within the initial geolocation home range for the user, and the sub-program for modifying the initial geolocation home range for the user based upon said change comprises sub-programs for:
    modifying the home list of recent user geolocations by replacing an oldest one of the geolocation data points in said home list with the geolocation data point specifying the current geolocation of said computing device;
    generating a current micro-range corresponding to the geolocation data point specifying the current geolocation of said computing device, said current micro-range having the prescribed shape that is centered on the geolocation data point specifying the current geolocation of said computing device;
    modifying the home set of micro-ranges by replacing the micro-range corresponding to said oldest one of the geolocation data points in said home set with said current micro-range; and assigning a union of the micro-ranges in the modified home set of micro-ranges to be a revised geolocation home range for the user.

10. The system of claim 9, wherein the prescribed manner further comprises the user increasing their commute distance, and the revised geolocation home range for the user is an expanded version of the initial geolocation home range for the user that accommodates said increased commute distance.

11. The system of claim 9, wherein the prescribed manner further comprises the user decreasing their commute distance, and the revised geolocation home range for the user is a shrunken version of the initial geolocation home range for the user that accommodates said decreased commute distance.

12. The system of claim 2, wherein the prescribed manner comprises the geolocation data point specifying the current geolocation of said computing device being outside the initial geolocation home range for the user, and the sub-program for modifying the initial geolocation home range for the user based upon said change comprises sub-programs for:
  storing the geolocation data point specifying the current geolocation of said computing device in a not-home list of recent user geolocations for as long as said geolocation data point continues to be outside the initial geolocation home range for the user;
  whenever the not-home list of recent user geolocations comprises a prescribed number of geolocation data points,
    for each of the geolocation data points in said not-home list,
      generating a micro-range corresponding to the geolocation data point, said micro-range having a prescribed shape that is centered on the geolocation data point, the prescribed shape having a prescribed size, and
      storing said micro-range in a not-home set of micro-ranges, and
    assigning a union of the micro-ranges in said not-home set to be a secondary geolocation home range for the user, wherein the user is considered to be within their secondary geolocation home range whenever the geolocation data point specifying the current geolocation of said computing device is within one or more of the micro-ranges in said not-home set;
  whenever the geolocation data point specifying the current geolocation of said computing device is within the secondary home range for the user,
    modifying the not-home list of recent user geolocations by replacing an oldest one of the geolocation data points in said not-home list with the geolocation data point specifying the current geolocation of said computing device,
    generating a current micro-range corresponding to the geolocation data point specifying the current geolocation of said computing device, said current micro-range having the prescribed shape that is centered on the geolocation data point specifying the current geolocation of said computing device,
    modifying the not-home set of micro-ranges by replacing the micro-range corresponding to said oldest one of the geolocation data points in said not-home set with said current micro-range, and
    assigning a union of the micro-ranges in the modified not-home set of micro-ranges to be a revised secondary home range for the user; and
  whenever the geolocation data point specifying the current geolocation of said computing device has been within the revised secondary home range for the user for more than a prescribed number of consecutive days, assigning the revised secondary home range for the user to be a new geolocation home range for the user.

13. The system of claim 12, wherein,
  the prescribed number of geolocation data points is 40 geolocation data points,
  the prescribed shape is a circle, and
  the prescribed size is a radius of 29 kilometers.

14. The system of claim 12, wherein the prescribed number of consecutive days is 31 consecutive days.

15. The system of claim 12, wherein the sub-program for storing the geolocation data point specifying the current geolocation of said computing device in a not-home list of recent user geolocations for as long as said geolocation data point continues to be outside the initial geolocation home range for the user comprises a sub-program for setting an on vacation indicator to true to indicate that the user is currently on vacation.

16. The system of claim 15, wherein the sub-program for assigning the revised secondary home range for the user to be a new geolocation home range for the user comprises a sub-program for setting the on vacation indicator to false to indicate that the user has permanently moved to a geolocation that is within said new geolocation home range.

17. A geolocation home range management system, comprising:
  a geolocation home range manager comprising one or more computing devices, said computing devices being in communication with each other via a computer network whenever there is a plurality of computing devices, and a computer program having a plurality of sub-programs executable by said computing devices, wherein the sub-programs configure said computing devices to,
  continuously track a current geolocation of a user as they travel to different geolocations,
  based upon said continuous tracking, establish an initial geolocation home range for the user with a union of a plurality of two-dimensional micro-ranges, wherein each of the two-dimensional micro-ranges is defined by said continuous tracking and corresponds to a particular geolocation the user traveled to, wherein the plurality of two-dimensional micro-ranges define one or more geographically distinct geo-fenced geographic regions, and
  whenever the current geolocation of the user changes in a prescribed manner, modify the initial geolocation home range for the user based upon said change.

18. The system of claim 17, wherein the sub-program for continuously tracking a current geolocation of a user as they travel to different geolocations comprises a sub-program for, every prescribed interval of time,
  receiving a geolocation data point specifying a current geolocation of a mobile computing device that is carried by the user, and
  storing the geolocation data point in a list of recent user geolocations.

19. The system of claim 18, wherein the sub-program for establishing an initial geolocation home range for the user based upon said continuous tracking comprises a sub-program for, whenever the list of recent user geolocations comprises a prescribed number of geolocation data points,
  for each of the geolocation data points in said list, generating a micro-range corresponding to the geolocation data point, said micro-range having a prescribed shape that is centered on the geolocation data point, the prescribed shape having a prescribed size, and storing said micro-range in a set of micro-ranges, and assigning a union of the micro-ranges in said set to be the initial geolocation home range for the user, wherein the user is considered to be within their initial geolocation home range whenever the geolocation data point specifying the current geolocation of said mobile computing device is within one or more of the micro-ranges in said set.

20. A computer-implemented geolocation home range management process comprising the actions of:

using one or more computing devices to perform the following process actions, the computing devices being in communication with each other via a computer network whenever a plurality of computing devices is used:

continuously tracking a current geolocation of a user as they travel to different geolocations;

based upon said continuous tracking, establish an initial geolocation home range for the user with a union of a plurality of two-dimensional micro-ranges, wherein each of the two-dimensional micro-ranges is defined by said continuous tracking and corresponds to a particular geolocation the user traveled to, wherein the plurality of two-dimensional micro-ranges define one or more geographically distinct geo-fenced geographic regions, and whenever the current geolocation of the user changes in a prescribed manner, modifying the initial geolocation home range for the user based upon said change.

* * * * *